United States Patent
Adaszewski et al.

(10) Patent No.: US 10,870,179 B2
(45) Date of Patent: Dec. 22, 2020

(54) CYLINDRICAL COMPRESSOR WITH STANDARDIZED SHELL AND CORE

(71) Applicant: GE Oil & Gas Compression Systems, LLC, Houston, TX (US)

(72) Inventors: Piotr Adaszewski, Warsaw (PL); Tyson Dailey, Houston, TX (US); Katarzyna Kierska, Warsaw (PL); Everette Johnson, Houston, TX (US); Scott Nolen, Houston, TX (US); Jaroslaw Gielwanowski, Warsaw (PL); Jan Wojnar, Warsaw (PL); Mark Patterson, Houston, TX (US); Kyle Sembera, Houston, TX (US); Konrad Slawomir Skibinski, Warsaw (PL); Artur Kosla, Warsaw (PL)

( * ) Notice: Subject to any disclaimer, the term of this patent is extended or adjusted under 35 U.S.C. 154(b) by 0 days.

(21) Appl. No.: 16/787,436

(22) Filed: Feb. 11, 2020

(65) Prior Publication Data

US 2020/0262012 A1    Aug. 20, 2020

Related U.S. Application Data

(60) Provisional application No. 62/806,606, filed on Feb. 15, 2019.

(51) Int. Cl.
    *B23P 15/00*    (2006.01)
    *F04B 53/16*    (2006.01)
    *F04B 53/14*    (2006.01)

(52) U.S. Cl.
    CPC ............ *B23P 15/00* (2013.01); *F04B 53/144* (2013.01); *F04B 53/166* (2013.01)

(58) Field of Classification Search
    CPC ......... Y10T 29/49236; Y10T 29/49238; F04B 53/166; F04B 53/144
    See application file for complete search history.

(56) References Cited

U.S. PATENT DOCUMENTS 5,735,675 A    4/1998  Peoples et al.
6,238,192 B1 *  5/2001  Lee ...................... F04B 35/045
                                                        310/12.16

(Continued)

OTHER PUBLICATIONS

International Search Report and Written Opinion in International Application No. PCT/US2020/017632, dated Apr. 16, 2020 (15 pages).

*Primary Examiner* — Jason L Vaughan
*Assistant Examiner* — Amanda Kreiling
(74) *Attorney, Agent, or Firm* — Benesch, Friedlander, Coplan & Aronoff LLP

(57) ABSTRACT

Systems, devices, and methods of manufacture are provided for a cylindrical compressor with a standardized shell and core. The compressor including a cylindrical cast metal shell having a shell bore extending longitudinally therethrough and configured to receive a cylindrical cast metal core. The core having a core bore extending longitudinally therethrough defining a core bore diameter within a predefined range of diameters and corresponding to a shell bore diameter. The core having an outer diameter configured to provide an interference fit between the core and the shell when the core is disposed within the shell. The compressor including a plurality of valve assemblies extending through the shell and the core so as to interface a valve of the valve assembly with the core bore and further including cylinder head coupled to the shell, a piston rod assembly configured within the core bore, and a packing case coupled to the core.

18 Claims, 13 Drawing Sheets

(56) References Cited

U.S. PATENT DOCUMENTS

2003/0228227 A1\* 12/2003 Jacobsen ................. F04B 9/125
417/53
2015/0240814 A1\* 8/2015 Snyder .................... F04C 18/34
137/565.17

\* cited by examiner

| Core Bore Diameters | SHELL 1 4.5-9.0 inches | | | | SHELL 2 9.25-14.0 inches | | | | SHELL 3 14.25-20.0 inches | | SHELL 4 20.0-26.5 inches | |
|---|---|---|---|---|---|---|---|---|---|---|---|---|
| Valve sizes | A (90mm) | B (102mm) | C (127mm) | D (158mm) | D (158mm) | E (169mm) | F (190mm) | | F (190mm) | G (221mm) | F (190mm) | G (221mm) |
| Valve Cap Diameter | A | B | C | D | D | E | F | | F | G | F | G |
| Valve Holder Size | A | B | C | D | D | E | F | | F | G | F | G |
| Valve Holder lengths | 1 to 7 | 1 to 10 | 1 to 10 | 1 to 10 | 1 to 9 | 1 to 22 | 1 to 9 | | 1 to 23 | 1 to 25 | 1 to 21 | 1 to 31 |
| Valves per corner | | 1 | | | 2 | 1 or 2 | 1 | | 2 | | 3 | |

FIG. 4

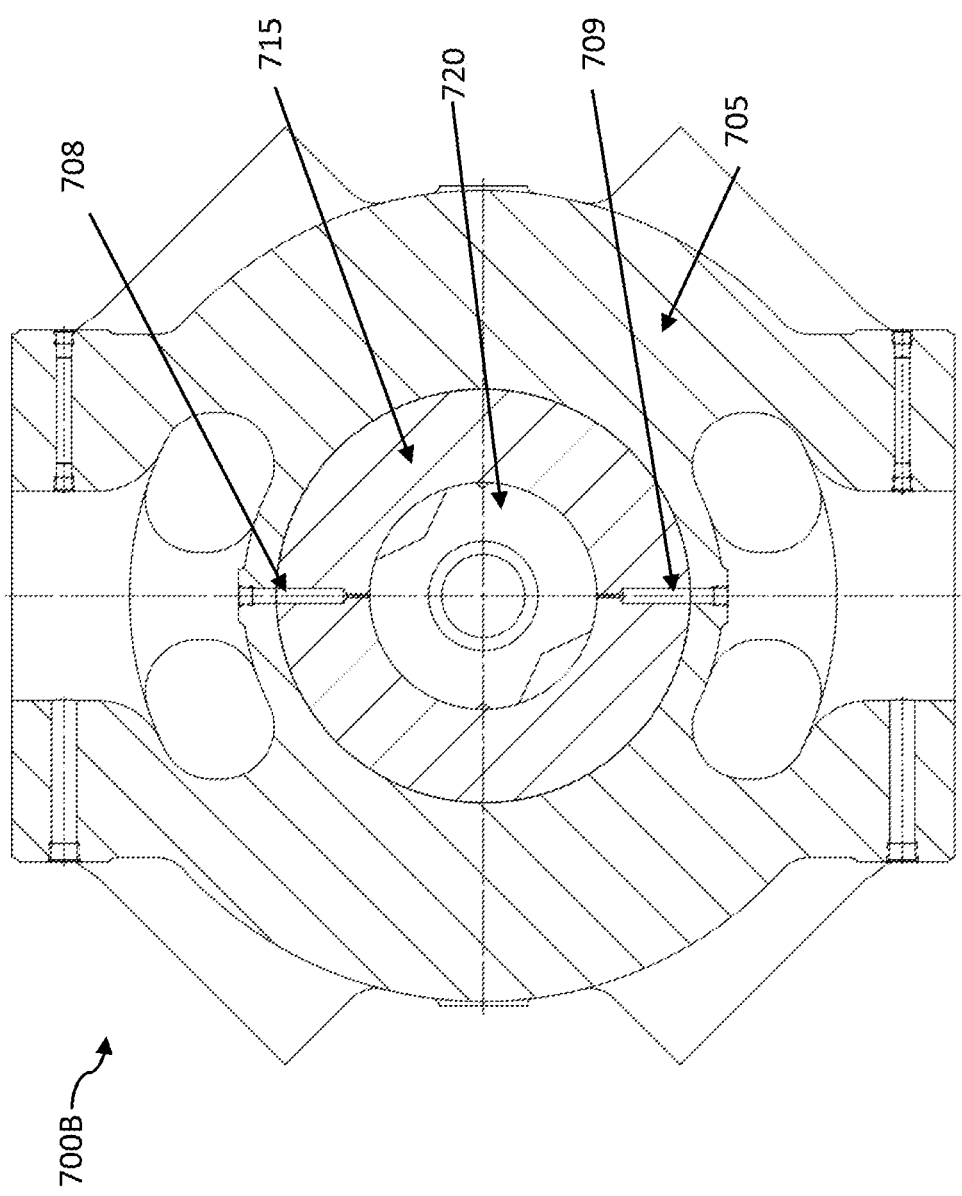

CYLINDRICAL COMPRESSOR WITH STANDARDIZED SHELL AND CORE

CROSS-REFERENCE TO RELATED APPLICATIONS

The present application claims the benefit of U.S. Provisional Application No. 62/806,606, which was filed on Feb. 15, 2019, and which is incorporated herein by reference.

BACKGROUND

Compressors are mechanical devices which are commonly used within oil and gas production environments to compress natural gas for distribution or further processing within the production environment. Natural gas compressors that are commonly used in oil and gas production environments include positive displacement gas compressors which typically employ a mechanical linkage to reduce the volume of a gas. The positive displacement of the mechanical linkage, such as a piston assembly operating within the compressor, causes the compressor to receive uncompressed natural gas via an input valve or valve assembly, compress the received gas within an interior volume or bore, and distribute the natural gas, as compressed natural gas at a higher pressure, via an output valve or valve assembly.

A typical compressor includes a shell, a bore within the shell to receive a piston assembly, and a number of valve assemblies that may be operable to receive uncompressed and may distribute natural gas which has been compressed by the piston assembly. The bore size within the compressor can have a broad range of sizes depending on the operational requirements of the production environment. For a manufacturer offering a diverse portfolio of differently dimensioned compressor products with many combinations of possible add-on components, it is not cost effective to maintain in inventory every possible product combination as doing so can create larger footprints of stored inventory. Instead, each customized compressor is manufactured individually once an order is placed. Manufacturing compressors in this manner can cause longer lead times and a delay in delivery to the customer.

SUMMARY

In general, devices, kits, and methods are provided for manufacturing a compressor for compressing and distributing natural gas.

In one aspect, a kit of parts for assembling a compressor for compressing and distributing natural gas is provided and includes first and second cylindrical cast metal shells. The first cylindrical cast metal shell can have a shell bore extending longitudinally therethrough and defining a first shell bore diameter that is configured to receive a cylindrical metal core having a core bore diameter within a first predefined range of diameters, and the second cylindrical cast metal shell can have a shell bore extending longitudinally therethrough and defining a second shell bore diameter that differs from the first shell bore diameter and that is configured to receive a cylindrical metal core having a core bore diameter within a second predefined range of diameters. The first predefined range of diameters can differ from the second predefined range of diameters. The kit can also include a cylindrical metal core have an outer diameter that provides an interference fit between the cylindrical metal core and one of the first and second cylindrical cast metal shells when the cylindrical metal core is disposed within the shell bore of the one of the first and second cylindrical cast metal shells. The cylindrical metal core can have a core bore extending longitudinally therethrough that defines a core bore diameter within one of the first and second predefined range of diameters. The kit can also include a cylinder head configured to removably couple to a first end of the cylindrical cast metal shell, a piston assembly configured to be positioned within the core bore and including a piston coupled to a piston rod, and a packing case configured to couple to the cylindrical metal core at a second end of the cylindrical cast metal shell, the packing case being configured to allow a piston rod to travel longitudinally through the core bore.

In another aspect, a method for manufacturing a compressor for compressing and distributing natural gas is provided and includes selecting one of first and second cylindrical cast metal shells. The first cylindrical cast metal shell can have a shell bore extending longitudinally therethrough and defining a first shell bore diameter that is configured to receive a cylindrical metal core having a core bore diameter within a first predefined range of diameters. The second cylindrical cast metal shell can have a shell bore extending longitudinally therethrough and defining a second shell bore diameter that differs from the first shell bore diameter and that is configured to receive a cylindrical metal core having a core bore diameter within a second predefined range of diameters. The first predefined range of diameters can differ from the second predefined range of diameters. The method can further include machining a cast metal rod to form a cylindrical metal core having an outer diameter that provides an interference fit between the cylindrical metal core and the selected one of the first and second cylindrical cast metal shells when the cylindrical metal core is disposed within the shell bore of the selected one of the first and second cylindrical cast metal shells. The method can also include machining the cylindrical metal core to having a core bore extending longitudinally therethrough that defines a core bore diameter that is within one of the first and second predefined range of diameters that corresponds to the selected one of the first and second cylindrical cast metal shells. The method can further include inserting the cylindrical metal core into the shell bore of the selected one of the first and second cylindrical cast metal shells, inserting a piston assembly within the core bore of the cylindrical metal core, fastening a cylinder head to a first end of the selected one of the first and second cylindrical cast metal shells, and fastening a packing case to the cylindrical metal core at a second end of the selected one of the first and second cylindrical cast metal shells. The packing case can include a packing case flange and it can allow a piston rod of the piston assembly to travel longitudinally through the core bore.

In general, a kit of parts for a compressor including a plurality of valve assemblies and a method of manufacturing the compressor including a plurality of valve assemblies are provided herein. In one aspect, a kit of parts for assembling a compressor for compressing and distributing natural gas is provided and includes a first cylindrical cast metal shell having a shell bore extending longitudinally therethrough and defining a first shell bore diameter that is configured to receive a cylindrical metal core having a core bore diameter within a first predefined range of diameters. The kit further includes a second cylindrical cast metal shell having a shell bore extending longitudinally therethrough and defining a second shell bore diameter that differs from the first shell bore diameter that is configured to receive a cylindrical metal core having a core bore diameter within a second predefined range of diameters. The second predefined range of diameters can differ from the first predefined range of diameters. The kit can further include a plurality of first valve assemblies configured to be received within a core bore extending through the first cylindrical cast metal shell and through a cylindrical metal core disposed therein. The plurality of first valve assemblies can have differing valve sizes with the size of each of the plurality of first valve assemblies falling within a range that correlates to the first predefined range of diameters. The kit can also include a plurality of second valve assemblies configured to be received within a core bore extending through the second cylindrical cast metal shell and through a cylindrical metal core disposed therein. The plurality of second valve assemblies can have differing valve sizes, with the size of each of the plurality of second valve assemblies falling within a range that correlates to the second predefined range of diameters. The kit can also include a cylinder head configured to removably couple to a first end of one of the first and second cylindrical cast metal shells, a piston assembly configured to be positioned within a core bore in a cast metal core disposed in one of the first and second cylindrical cast metal shells, and a packing case configured to couple to a second end of one of the first and second cylindrical cast metal shells.

In another aspect, a method for manufacturing a compressor for compressing and distributing natural gas is provided and includes selecting one of first and second cylindrical cast metal shells. The first cylindrical cast metal shell can have a shell bore extending longitudinally therethrough and defining a first shell bore diameter that is configured to receive a cylindrical metal core having a core bore diameter within a first predefined range of diameters, and the second cylindrical cast metal shell can have a shell bore extending longitudinally therethrough and defining a second shell bore diameter that differs from the first shell bore diameter and that is configured to receive a cylindrical metal core having a core bore diameter within a second predefined range of diameters. The first predefined range of diameters can differ from the second predefined range of diameters. The method can further include machining a cast metal rod to form a cylindrical metal core having an outer diameter that provides an interference fit between the cylindrical metal core and the selected one of the first and second cylindrical cast metal shells when the cylindrical metal core is disposed within the shell bore of the selected one of the first and second cylindrical cast metal shells. The method can further include inserting the cylindrical metal core into the shell bore of the selected one of the first and second cylindrical cast metal shells. The method can also include machining the cylindrical metal core to having a core bore extending longitudinally therethrough that defines a core bore diameter that is within one of the first and second predefined range of diameters that corresponds to the selected one of the first and second cylindrical cast metal shells. The method can further include machining at least one valve assembly bore through the cylindrical metal core and the selected one of the first and second cylindrical cast metal shells and inserting at least one valve assembly into the at least one valve assembly bore, inserting a piston assembly within the core bore of the cylindrical metal core, fastening a cylinder head to a first end of the selected one of the first and second cylindrical cast metal shells, and fastening a packing case to the cylindrical metal core at a second end of the selected one of the first and second cylindrical cast metal shells, the packing case including a packing case flange and allowing a piston rod of the piston assembly to travel longitudinally through the core bore.

In general, a compressor including a plurality of valve assemblies and a system including the compressor including a plurality of valve assemblies are provided herein. In one aspect, a compressor for compressing and distributing natural gas is provided and includes a shell/core assembly having a cylindrical cast metal shell having a shell bore extending longitudinally therethrough and defining a shell bore diameter, and a cylindrical metal core retained by interference fit within the shell bore. The cylindrical metal core can have a core bore extending longitudinally therethrough defining a core bore diameter, and the shell/core assembly can have at least one valve assembly bore extending through a sidewall of the shell and a sidewall of the core for communicating with the core bore. The compressor can also include at least one valve assembly disposed within the at least one valve assembly bore such that a portion of the at least one valve assembly is seated within the core. The compressor can further include a cylinder head coupled to a first end of the shell, a piston assembly positioned within the core bore and including a piston coupled to a piston rod, and a packing case coupled to the core at a second end of the shell, the packing case configured to allow the piston rod to travel longitudinally through the core bore.

In other aspects, a system for compressing and distributing natural gas in an oil and gas production environment is provided and includes at least one of an engine and a motor, a suction pulsation device, a discharge pulsation device, and a compressor frame configured with a plurality of compressor cylinders operably connected to the at least one of the engine and motor. Each of the plurality of compressor cylinders can include a shell/core assembly having a cylindrical cast metal shell having a shell bore extending longitudinally therethrough and defining a shell bore diameter, and a cylindrical metal core retained by interference fit within the shell bore. The cylindrical metal core can have a core bore extending longitudinally therethrough defining a core bore diameter, and the shell/core assembly can have at least one valve assembly bore extending through a sidewall of the shell and a sidewall of the core for communicating with the core bore. At least one valve assembly can be disposed within the at least one valve assembly bore such that a portion of the at least one valve assembly is seated within the core, a cylinder head can be coupled to a first end of the shell/core, a piston assembly can be positioned within the core bore and including a piston coupled to a piston rod, and a packing case can be coupled to the shell/core at a second end of the shell/core, the packing case configured to allow the piston rod to travel longitudinally through the core bore.

DESCRIPTION OF DRAWINGS

These and other features will be more readily understood from the following detailed description taken in conjunction with the accompanying drawings, in which:

FIG. 4 is a table showing exemplary size ranges for cores and valves for use with four different standardized shells;

FIG. 7B is a cross-sectional view of another embodiment of a cylindrical compressor with a standardized shell and core configured with a set of lube channels;

Figure 1:
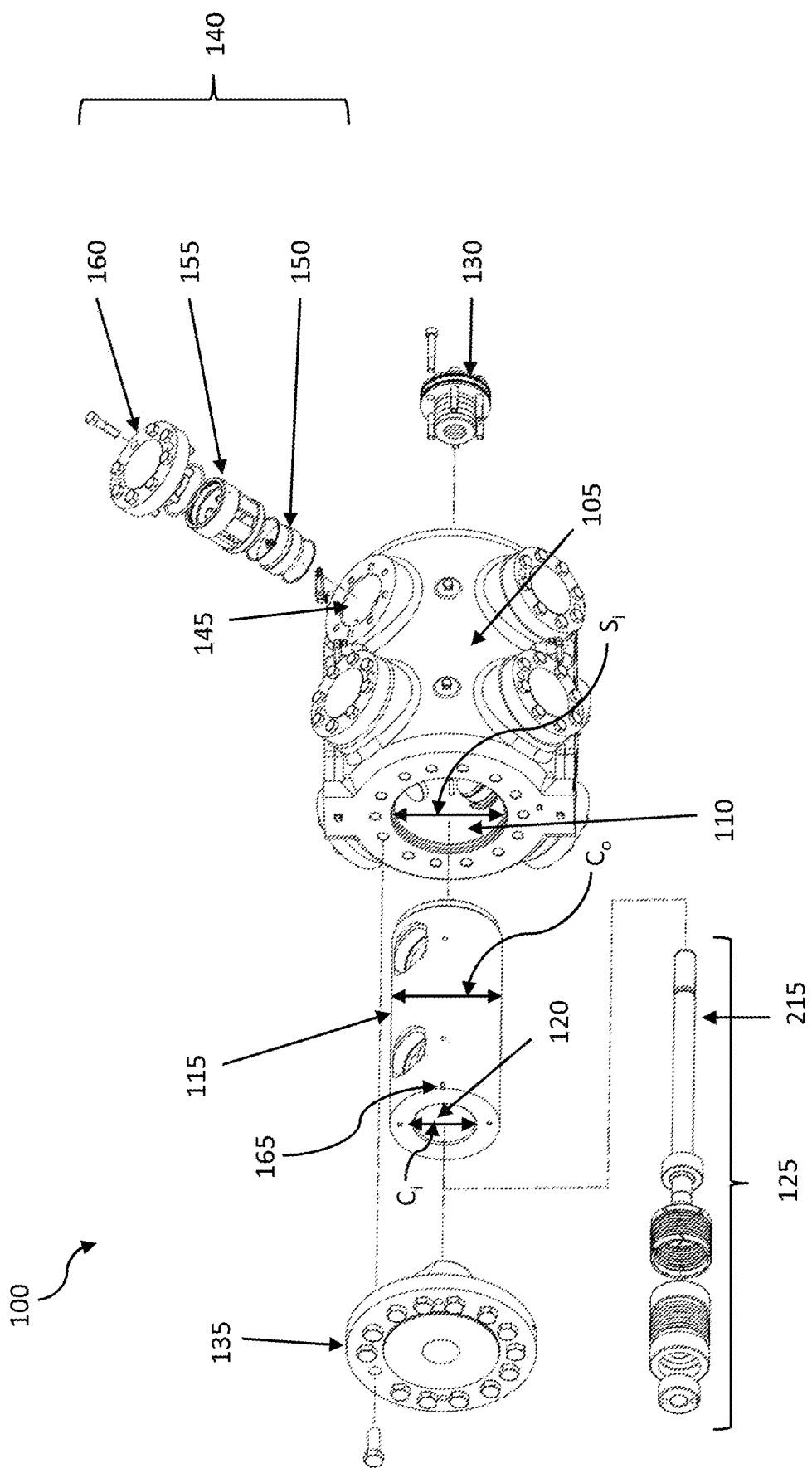
FIG. 1 is an exploded perspective view of one embodiment of a cylindrical compressor having a standardized shell and a core.

It is noted that the drawings are not necessarily to scale. The drawings are intended to depict only typical aspects of the subject matter disclosed herein, and therefore should not be considered as limiting the scope of the disclosure.

DETAILED DESCRIPTION

Various exemplary devices, kits, and methods are provided for manufacturing and assembling compressors and systems. The various exemplary devices, kits, and methods use standardized shells of varying sizes that are each configured to receive a core that can be machined to have a core bore diameter that falls within a predefined range of diameters acceptable for use with the selected standardized shell. In this way, one of a set of preformed standardized shells can be stocked in inventory and selected as needed based on a desired size, and a core can be easily machined to have a range of core bore diameters that correlate to the selected standardized shell. Moreover, one or more valve bores can be machined through a shell/core assembly, and the valve bore can be configured to seat a valve within the core. Such a configuration allows a range of valve sizes to be utilized with each standardized core. The position of the valve within the core may achieve increased efficiencies compared to compressors with valve assembles that only extend into the shell and do not extend into the core to interface with the bore. Additional components of the improved compressor, such as a packing case, a cylinder head, and one or more piston assemblies, can also be standardized in relation to the standardized shell and core.

The improved compressor and method of manufacturing and assembling enables manufacturers to reduce lead times between the time at which a customer order is received and the time at which the compressor is delivered to the customer. By using separate, modular components, such as the standardized shell and core, fewer shell castings can be used to cover a broad range of compressor dimensions and specifications. In this manner, standardized shells and cores, as well as additional standardized components, can be accumulated in inventory and machined to final specifications quickly while maintaining a smaller inventory footprint thereby reducing the costs associated with storing and maintaining necessary inventory. Additionally, by standardizing shell configurations manufacturers will need fewer castings resulting in less maintenance and upkeep of the casting patterns compared to traditional manufacturing methods where new casting patterns must be repeatedly created for each non-standardized shell that is cast according to the specific dimensions of the compressor that a particular customer has ordered.

The improved compressor design and method of manufacturing also permits a reduction in quality control costs since casting or machining errors can be contained within a relatively small set of casting patterns or machining methods compared to non-standardized castings where each casting is dimensioned as a uniquely different cast from another cast. Quality control costs are further reduced since the inner core may be a replaceable component that may be separated from the shell. In this way, shells may be re-used when a defect is found within a particular core and/or cores may be re-used when a defect is found within a particular shell. This approach to compressor design and manufacturing can further allow manufacturers to purchase component inventory in bulk well in advance of receiving customer orders which can further reduce manufacturing costs and allow for maintenance of sufficient inventory to meet unexpected customer demands.

The devices, kits, and methods herein also produce a number of additional advantages and/or technical effects.

Embodiments of systems, devices and corresponding methods of manufacture for an improved natural gas compressor with a standardized shell and core for use in an oil and gas production environment are discussed herein. However, embodiments of the disclosure can be employed for non-gas compressors, such as fluid compressors, in other types of production environments without limit.

FIG. 1 is a diagram illustrating one exemplary embodiment of a cylindrical compressor 100 with a standardized shell 105 and core 115. As shown, the shell 105 has a shell bore 110 extending longitudinally therethrough, and the core 115 has a core bore 120 extending longitudinally therethrough. The compressor 100 further includes a piston assembly 125, a packing case 130, and a cylinder head 135. The compressor 100 also includes a valve assembly 140 which is positioned within one of multiple valve bores 145. The valve assembly 140 includes a valve 150, a valve holder 155, and a valve cap 160. In some embodiments, the compressor 100 may also include a lube channel and an indicator port.

The shell 105 can be formed from various materials and using various techniques. In an exemplary embodiment, the shell is cast from metal, such as ASTM A536 80-55-06 cast iron. The shell 105 can be cast with the shell bore 110 formed therein, or the shell bore 110 may be machined to tolerances required for assembling the core 115 within the shell bore 110. One or more valve bores 145 can be subsequently machined into the assembled shell and core once the core 120 has been positioned within the shell bore 110 to form the shell/core assembly. A number of standardized shells can be kept in inventory, and each standardized shell can have a shell bore 110 with an inner diameter $S_i$ that differs from one another. Each shell bore diameter $S_i$ can allow the shell to receive a core 115 having a core bore diameter $C_i$ within a predefined range of diameters. Such a configuration allows shell/core assemblies having differing core bore diameters $C_i$ to be constructed from a single standardized shell 105 and optionally a single core 120, as will be discussed in more detail below.

The core 115 can also be formed from various materials and using various techniques. In an exemplary embodiment, the core 115 is formed from metal bar stock. In some embodiments, the core 115 can be formed from Dura-bar®. The core 115 can have a core outer diameter $C_o$ that corresponds to the diameter $S_i$ of the shell bore 110 such that a small overlap between the two diameters exists to ensure an interference fit between the shell 105 and the core 115. To achieve the interference fit, the core 115 may be cooled, causing the core to shrink to aid insertion into the shell 105. Upon insertion, the shell 105 and inserted core 115 may be warmed or allowed to return to room temperature, causing the core 115 to expand and to engage the shell 105 by interference fit.

A manufacturer may maintain an inventory of bar stock with varying outer diameters $C_o$ that correspond to the shell bore diameter $S_i$ of each of the standardized shells 105, or the manufacturer may machine the bar stock as needed to have a particular outer diameter $C_o$. Either prior to or after insertion of the core 115 into the shell 105, the core 115 can be machined to have a core bore 120 extending therethrough and defining a core bore inner diameter $C_i$. As indicated above, the core 115 can be machined to have a core bore diameter $C_i$ within a predefined range of diameters suitable for use with a selected one of the standardized shells 105.

As shown in FIG. 1, the compressor 100 also includes a piston assembly 125. The piston assembly can be positioned within the core bore 120 and can operably couple to an engine or an electric motor, as will be explained in more detail with respect to FIG. 8 below. As the crankcase turns, a piston 215 of the piston assembly 125 travels longitudinally or axially through the core bore 120 causing the compressor to take in uncompressed natural gas via an input valve assembly and to output compressed natural gas via an output valve assembly. A variety of standardized piston assemblies 125 may be configured which correspond to the core bore inner diameter $C_i$. In some embodiments, the piston assembly 125 may be a single piece assembly. In other embodiments, the piston assembly 125 may be a multi-piece assembly, such as a three piece assembly.

As further shown in FIG. 1, the compressor 100 also includes a packing case 130. The packing case 130 is assembled against the core 115 by multiple bolts and is dimensioned in a standardized manner to correspond to the dimensions of the core 115 to which is it attached. The packing case 130 is configured to allow the piston rod to travel therethrough during operation of the compressor 100. The end of the compressor 100 which includes the packing case 130 may be referred to as the "crank end." The packing case 130 may include an O-ring that is positioned at the crank end, as will be discussed in more detail with respect to FIG. 6. The O-ring may seal the packing case 130 into contact with the shell 105 and the core 115 to which it is attached.

As shown in FIG. 1, the compressor 100 also includes a cylinder head 135. The cylinder head 135 is assembled against a recessed surface of the shell 105 and the core 115 at the "head end" of the compressor 100 and is secured by multiple bolts. The cylinder head 135 may include a gasket positioned in contact with the recessed surface that may allow for uniform sealing of the interference line that is present between the shell 105 and the core 115 due to inserting the core into the shell. The cylinder head gasket, which is discussed in more detail with respect to FIG. 5, may further prevent blowout of the compressor 100. In some embodiments, the cylinder head 135 may further include a set screw 165 that is used as a back-up locking mechanism to the interference fit to keep the core 115 positioned securely within the shell 105 as the core bore 120 and valve assembly bores 145 are machined into the shell/core assembly. In this way, the core 115 is less likely to rotate within the shell 105 during the subsequent machining operations.

As shown in FIG. 1, the compressor 100 further includes a valve assembly 140. While FIG. 1 illustrates 8 valves bores for seating up to 8 valve assembly, the compressor 100 may include any number of valve assemblies 140 depending on the operational specifications of the compressor 100 and the diameter of the core bore 120. Blank or empty valve bores 145 may be machined into the shell 105 and core 115 and covered with a valve cap 160 until expansion of compressor's capacity is required or until a customer order has been received specifying the configuration of the valve assemblies.

The illustrated exemplary valve assembly 140 includes a spring-actuated valve 150, a valve holder 155, and a valve cap 160 which may be coupled to a valve assembly bore via a plurality of bolts. Each valve assembly 140 is positioned within a valve assembly bore 145 that has been machined through the shell 105 and the core 115 after inserting the core into the shell. As a result, a portion of the valve assembly 140, e.g., the valve 150, is positioned within a portion of the valve assembly bore that extends through the core 120. In this way, the efficiency of the compressor 100 can by maximized as a result of positioning the valve 150 of the valve assembly 140 as close as possible to the core bore 120 and thereby reducing the clearance between the valve 150 and the piston 215.

Figure 2:
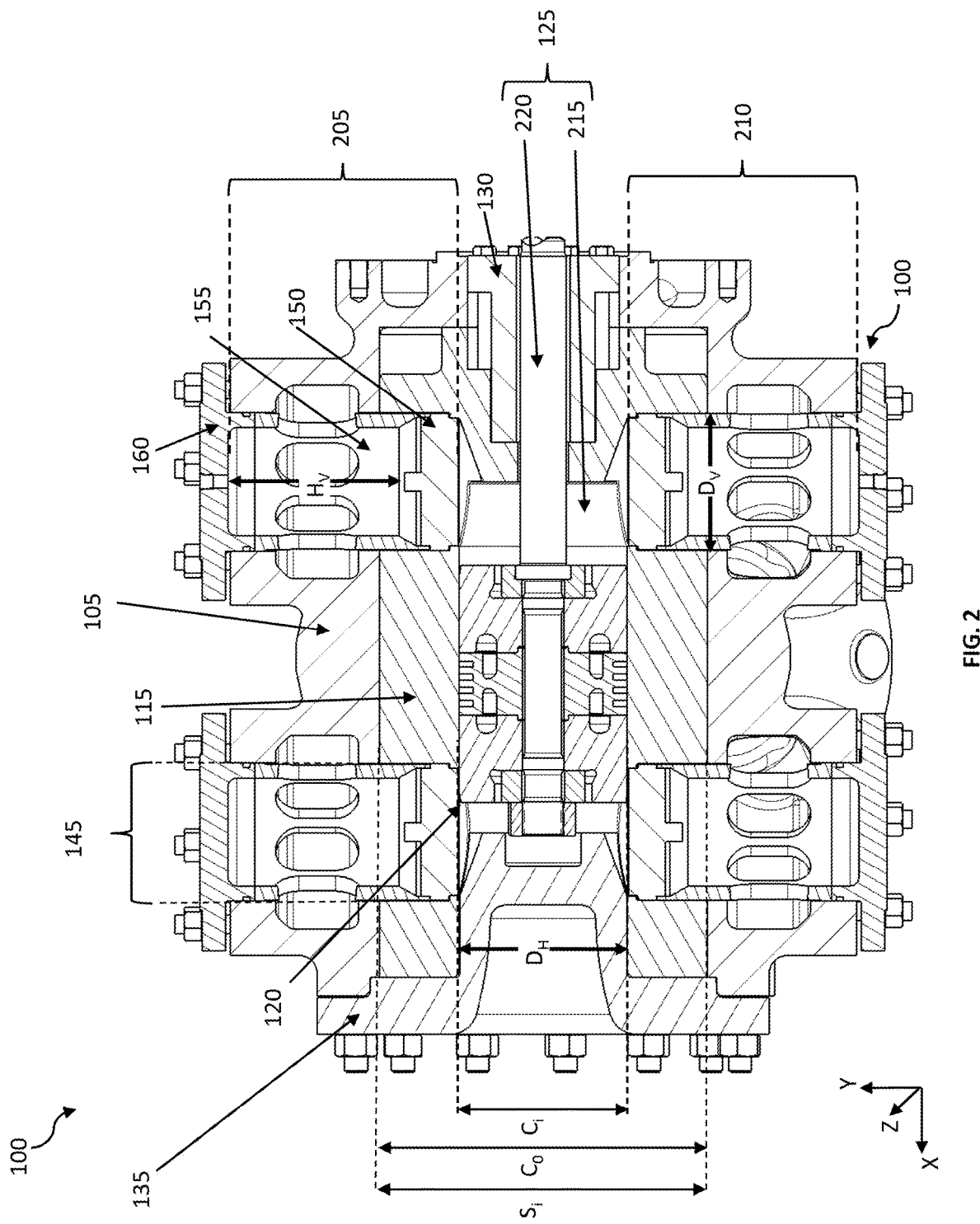
FIG. 2 is a cross-sectional view of the cylindrical compressor of FIG. 1.

FIG. 2 is a cross-sectional view of the compressor 100 of FIG. 1 shown in an assembled state. To aid discussion of the compressor 100, a reference axis indicator is provided in the lower left portion of the figure. The X-axis can be considered to be associated with a plane that traverses FIG. 2 horizontally, while the Y-axis can be considered to be associated with a plane that traverses FIG. 2 vertically. The Z-axis can be considered to be associated with a plane extending into and out of the diagram shown in FIG. 2.

As shown in FIG. 2, the compressor 100 includes an input valve assembly 205 and a discharge valve assembly 210. The valve assemblies operate in a double-acting manner such that, as the piston 215 and a piston rod 220 of the piston assembly 125 travel in a first direction within the core bore 120, for example toward the crank end (e.g., toward the packing case 130), uncompressed natural gas is pulled into the core bore by the input valve assembly 205. As the piston 215 and the piston rod 220 of the piston assembly 225 travel in the opposite direction toward the head end (e.g., toward the cylinder head 135), the compressed natural gas is discharged via the discharge valve assembly 210. As a power source, such as an engine or electric motor operate to continuously rotate the crank case coupled to the piston assembly 125, the piston 215 travels between the head end and the crank end causing uncompressed natural gas to enter the compressor core bore 120 via the input valve assembly 205 while simultaneously discharging compressed natural gas from the core bore 120 via the discharge valve assembly 210.

Each valve assembly, such as the input valve assembly 205 and the discharge valve assembly 210, may include a spring loaded valve 150. In operation, when the pressure difference across the valve in the input valve assembly 205 is great enough, the valve 150 may open. Once the pressure difference equalizes, the spring loaded valve 150 may close. Similarly, as the pressure within the core bore 120 increases due to the piston 215 compressing the natural gas, the spring loaded valve 150 in the discharge valve assembly 210 opens to release the compressed natural gas via the discharge valve assembly 210. The springs loaded valves 150 can include springs that are configured to open based on different pressures. In this way, the spring loaded valves 150 included in the input valve assembly 205 and the spring loaded valves 150 included in the discharge valve assembly 210 do not open at the same time.

As indicated above, several standardized shells 105 having differing shell bore diameters $S_i$ can be provided (cast as needed or maintained in inventory), and each standardized shell 105 can be configured to couple with a core 115, one or more valve assemblies 140, a piston assembly 125, a packing case 130, and a cylinder head 135. Various dimensions can impact the ability for a given shell size to couple with any of these components. In particular, the diameter $S_i$ of the shell bore 110 allows the shell 105 to receive a core 115 having a core bore inner diameter $C_i$ that is within a predefined range of diameters that correspond to the particular shell bore diameter $S_i$. A core bore inner diameter $C_i$ that is less than the predefined range could impact efficient operation of the compressor, and a core bore inner diameter $C_i$ that is greater than the predefined range could result in a core 115 with thin sidewalls that could be subject to cracking or fracture. Moreover, the core bore diameter $C_i$ dictates a thickness of the sidewall of the core 115, which in turn can impact the acceptable range of sizes for the one or more valve bores 145 formed through the shell/core assembly. Multiple valve assemblies 140 of varying sizes can thus be provided, and each standardized shell can thus have a corresponding set of valve assemblies of varying sizes within a range acceptable for use with the particular standardized shell. Each valve size can also be configured to have a valve holder with a height $H_v$ within a predefined range, thus allowing the valve holder height to be varied for any given valve. Additionally, the core bore diameter 120 may also be used to determine the standardized dimensions of the diameter of the cylinder head 135 at its point of attachment to the core 115 represented as "DH" shown at the head end of compressor 100. Accordingly, standardized shells 105 of varying sizes can be provided, and each shell size can be allow coupling with one or more of a variety of cores 115 with varying core bore diameters $C_i$, a variety of valve assemblies 140 with differing sizes, and a variety of packing cases 130 and cylinder heads 135 of differing sizes. Moreover, each sized valve assembly 140 can have varying sized valve holders 155.

The particular number of standardized shells 105, as well as the parts that couple therewith, can vary as may be desired by any given manufacturer. In one exemplary embodiment, four standardized shells 105 are provided in four different sizes, as shown in FIGS. 3A-3D. FIG. 4 is a chart showing exemplary sizes for the core bore and the valve assemblies that can be used with four exemplary shells.

Figure 3A:
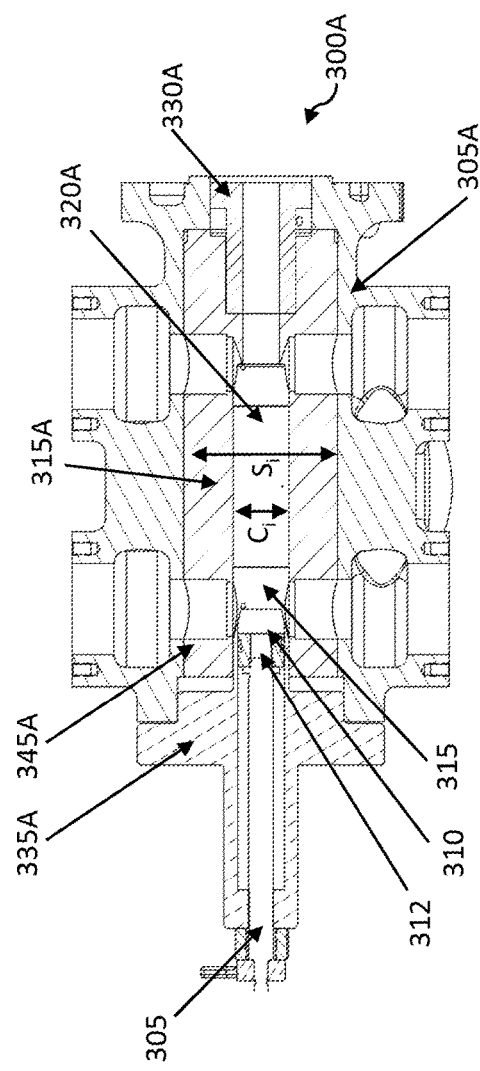
FIG. 3A is a cross-sectional view of a first cylindrical compressor assembled with a first standardized shell and a core having a core bore diameter within a first predefined range of diameters.

FIG. 3A illustrates a first compressor 300A having a first shell 305A with a shell bore diameter $S_i$ of a first size. The first shell 305A is configured to receive a core 315A having a core bore diameter $C_i$ within a first range of diameters. By way of non-limiting example, the first range of core bore diameters $C_i$ can be between about 4.5 inches and 9.0 inches, as shown in FIG. 4. With the core 315A assembled in the shell 305A, one or more valve bores 345A can be machined therethrough for seating one or more valve assemblies. Each valve bore 345A can be machined to have a valve bore size within a predefined range that correlates to the size of the first shell 305A. By way of non-limiting example, the valve bore 345A can be sized to accommodate valve sizes between about 90 mm and 158 mm, as shown in FIG. 4. A set of valve assemblies having predetermined sizes within the first range for the valve bore 345A can be provided. Exemplary valve assemblies include valve sizes of 90 mm (size A), 102 mm (size B), 127 mm (size C), and 158 mm (size D), as shown in FIG. 4. Each valve size can further accommodate a range of acceptable valve holder lengths. For example, valve size A can accommodate about 7 different valve holder lengths, and valve sizes B, C, and D can accommodate about 10 different valve holder lengths.

FIG. 3A further illustrates a variable volume clearance adjustment 305 that may be coupled to and configured with a variable volume clearance adjustment piston 310. The piston 310 can be operable to adjust the volume of a variable volume clearance pocket 315, and thus increase or decrease the overall dead volume present in the compressor 100. The variable volume clearance adjustment 305 may be a screw-actuated mechanism or the like that is configured within the cylinder head 335A to allow a compressor operator to change the dead volume within the compressor 300A. For example, the variable volume clearance adjustment 305 may be adjusted causing the variable volume clearance adjustment piston 310 to be positioned in relation to a variable volume clearance adjustment head 312 configured within the cylinder head 335A such that the size of the variable volume clearance pocket 315 may be increased or decreased based on the adjustment. Reducing the size of the variable volume clearance pocket 315, for example by positioning the volume clearance adjustment piston 310 closer to the packing case 330A, may further reduce the dead volume within the core bore 320A and increase the efficiency of the compressor 300A. This variable volume adjustment mechanism can be used in any of the compressors disclosed herein.

Figure 3B:
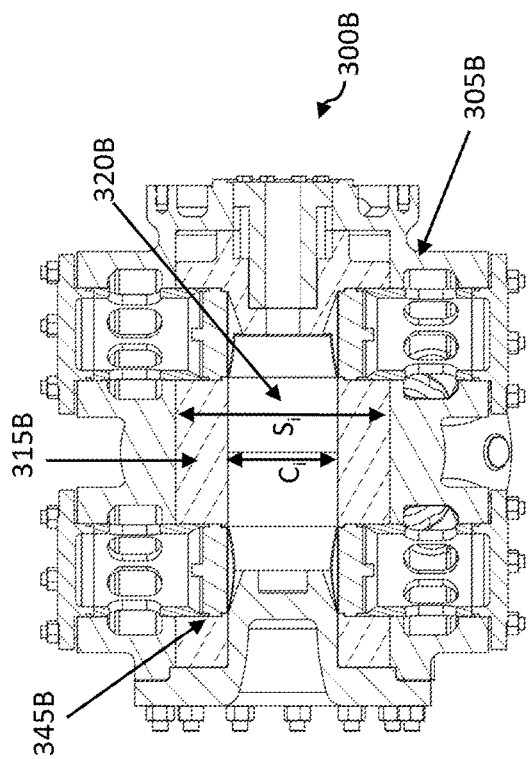
FIG. 3B is a cross-sectional view of a second cylindrical compressor assembled with a second standardized shell and a core having a core bore diameter within a second predefined range of diameters.

FIG. 3B illustrates a second compressor 300B having a second shell 305B with a shell bore diameter $S_i$ of a second size that is greater than the first size. The second shell 305B is configured to receive a core 315B having a core bore diameter $C_i$ within a second range of diameters, which in the illustrated embodiment is larger than the first range of diameters. By way of non-limiting example, the second range of core bore diameters $C_i$ can be between about 9.25 inches and 14.0 inches, as shown in FIG. 4. With the core 315B assembled in the shell 305B, one or more valve bores 345B can be machined therethrough for seating one or more valve assemblies. Each valve bore 345B can be machined to have a valve bore size within a predefined range that correlates to the size of the second shell 305B. By way of non-limiting example, the valve bore 345B can be sized to accommodate valve sizes between about 158 mm and 190 mm, as shown in FIG. 4. A set of valve assemblies having predetermined sizes within the second range for the valve bore 345B can be provided. Exemplary valve assemblies include valves sizes of 158 mm (size D), 169 mm (size E), and 190 mm (size F), as shown in FIG. 4. Each valve size can further accommodate a range of acceptable valve holder lengths, as explained above with respect to FIG. 3A. For example, valve size E can accommodate about 22 different valve holder lengths, and valve size F can accommodate about 9 different valve holder lengths.

Figure 3D:
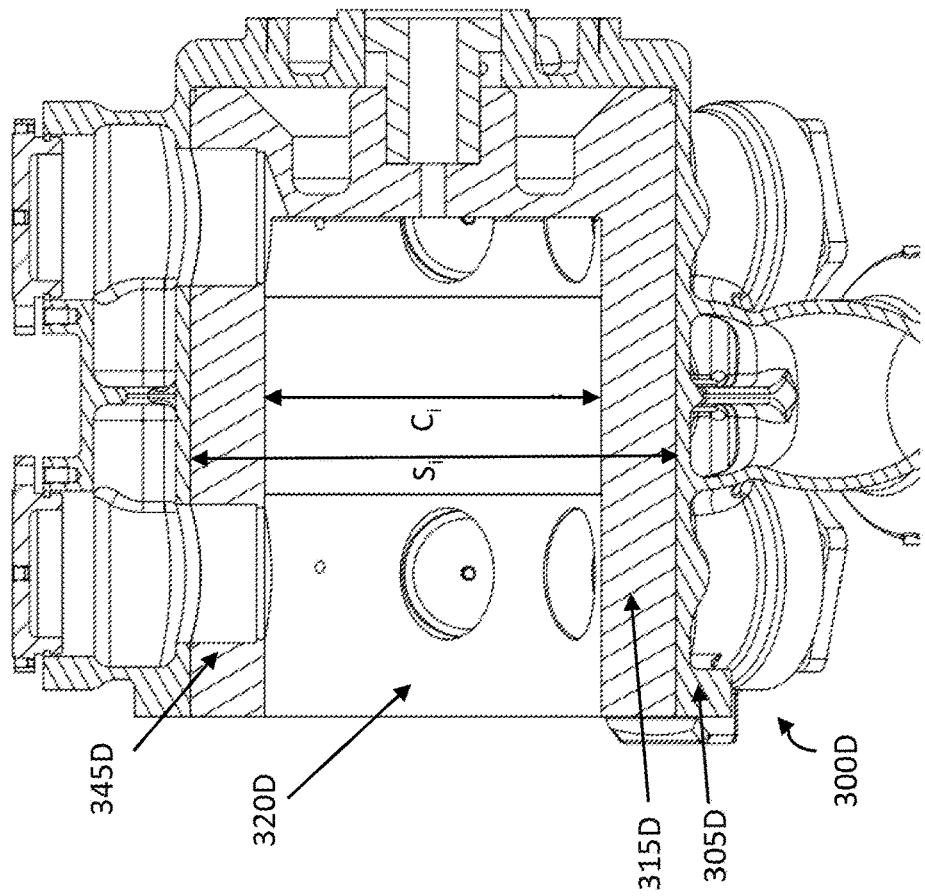
FIG. 3D is a cross-sectional view of a fourth cylindrical compressor with a fourth standardized shell and a core having a core bore diameter within a fourth predefined range of diameters.
Figure 3C:
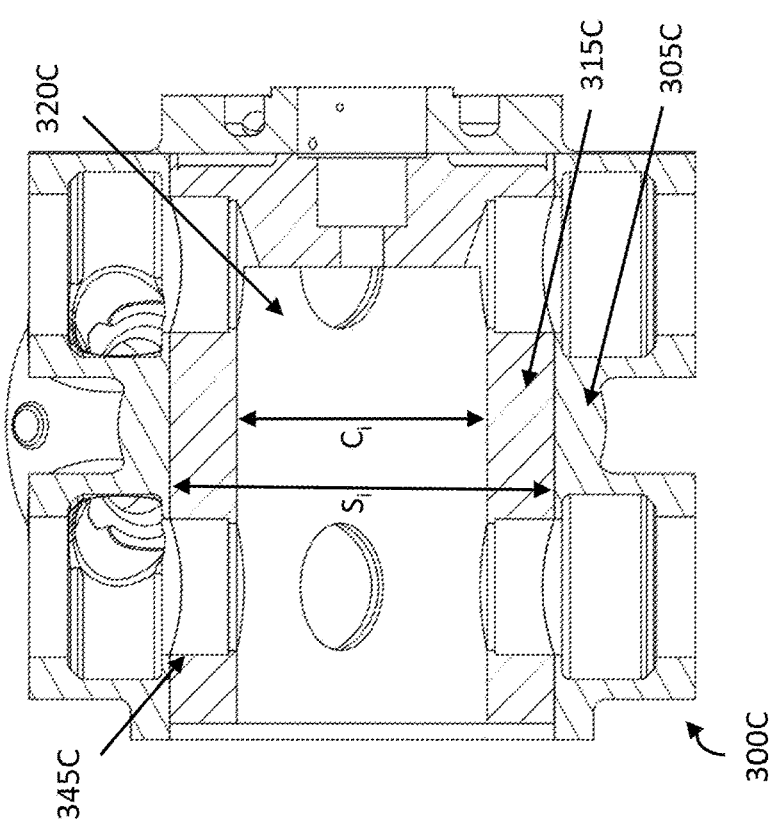
FIG. 3C is a cross-sectional view of a third cylindrical compressor with a third standardized shell and a core having a core bore diameter within a third predefined range of diameters.

FIG. 3C illustrates a third compressor 300C having a third shell 305C with a shell bore diameter $S_i$ of a third size that is greater than the second size. The third shell 305C is configured to receive a core 315C having a core bore diameter $C_i$ within a third range of diameters, which in the illustrated embodiment is larger than the second range of diameters. By way of non-limiting example, the third range of core bore diameters $C_i$ can be between about 14.25 inches and 20.0 inches, as shown in FIG. 4. With the core 315C assembled in the shell 305C, one or more valve bores 345C can be machined therethrough for seating one or more valve assemblies. Each valve bore 345C can be machined to have a valve bore size within a predefined range that correlates to the size of the third shell 305C. By way of non-limiting example, the valve bore 345C can be sized to accommodate valve sizes between about 190 mm and 221 mm, as shown in FIG. 4. A set of valve assemblies having predetermined sizes within the third range for the valve bore 345C can be provided. Exemplary valve assemblies include valve sizes of 190 mm (size F) and 221 mm (size G), as shown in FIG. 4. As explained above, each valve size can accommodate a range of acceptable valve holder lengths. For example, valve size G can accommodate about 25 different valve holder lengths.

FIG. 3D illustrates a fourth compressor 300D having a fourth shell 305D with a shell bore diameter $S_i$ of a fourth size that is greater than the third size. The fourth shell 305D is configured to receive a core 315D having a core bore diameter $C_i$ within a fourth range of diameters, which in the illustrated embodiment is larger than the third range of diameters. By way of non-limiting example, the fourth range of core bore diameters $C_i$ can be between about 20.0 inches and 26.5 inches, as shown in FIG. 4. With the core 315D assembled in the shell 305D, one or more valve bores 345D can be machined therethrough for seating one or more valve assemblies. Each valve bore 345D can be machined to have a valve bore size within a predefined range that correlates to the size of the fourth shell 305D. By way of non-limiting example, the valve bore 345D can be sized to accommodate valve sizes between about 190 mm and 221 mm, as shown in FIG. 4. This is the same as the range of valve sizes accommodated within the third shell. However, different valve sizes can also be used. A set of valve assemblies having predetermined sizes within the fourth range for the valve bore 345D can be provided. Exemplary valve assemblies include valve sizes of 190 mm (size F) and 221 mm (size G), as shown in FIG. 4.

As is apparent from FIG. 4 and the aforementioned description, the valve sizes within each range can overlap and the same valves can be used for different shells. This can vary based on the particular sizes of each shell.

As further shown in FIG. 4, each shell can be configured to have a certain number of valves per corner. The four corners of the shell are respectively associated with the suction or input valve assemblies located at the head end of the shell/core assembly, the suction or input valve assemblies located at the crank end of the shell/core assembly, the discharge or output valve assemblies located at the head end of the shell/core assembly, and the discharge or output valve assemblies located at the crank end of the shell/core assembly. For example, the first shell 305A can have a single valve at each corner of the compressor 300A, whereas the second shell 305B can have two valves per corner if valve size D is selected, can have one or two valves per corner if valve size E is selected, or can have only one valve per corner if valve size F is selected. Similarly, the third shell 305C, can have two valves per corner with either of valve size F or G, and the fourth shell 305D can have three valves per with either of valve size F or G.

The compressors 100 may include additional embodiments corresponding to other components or features which can be similarly standardized to a particular shell as described below. In some embodiments, a compressor configured with any of the first, second, third or fourth shells can be configured to accommodate stroke lengths of 5, 6, or 7 inches. With reference to FIG. 3A, the stroke is the length of travel of the piston 315 within the core bore 320A and corresponds to the longitudinal length of the shell 305A and the core 315A.

In some embodiments, a compressor configured with any one of a number of standardized shells sizes can accommodate various piston rod designs. Each of these four piston rod designs can correspond to a different compressor frame and crank case configuration to which the piston and piston assembly is operably connected. Each frame and crank case configuration is associated with a different operating envelope describing the maximum horsepower and maximum load that a given frame and crank case configuration can sustain. In this way, the standardized compressor can be configured with a range of compressor frames and crank case configurations that are not possible with traditional compressor designs.

In some embodiments, a compressor configured with any of the standardized shells can include "standard" or "long" rod lengths for the piston rod of the piston assembly. In some embodiments, the piston rod diameter can be 2.0, 2.25, 2.50, or 2.75 inches.

In some embodiments, a compressor that is configured with one of several standardized shells can support one of two different piston sizes in the piston assembly. For example, a compressor made using the first shell 305A and valve size A or B can be used with a single piece piston that is 4.5 to 6.5 inches in diameter. In other embodiments, a compressor made using the first shell 305A and valve size C or D can be used with a three piece piston that is 6.75 to 14.0 inches in diameter. Additionally, a compressor made using the second shell 305B and valve size D, E, or F can be used with a three piece piston that is 6.75 to 14.0 inches in diameter. In other embodiments, a compressor made with the third or fourth shell 305C, 305D and valve size F or G can be used with a three piece piston that is 14.25 to 26.5 in diameter. Smaller pistons, for example, pistons that are 4.5 to 6.5 inches, are light enough to be single piece components, while larger pistons may be formed from lightweight alloys and can thus be segmented into three pieces.

Any compressors assembled using any one of a variety of shell sizes can also include lubricated and non-lubricated piston types.

In some embodiments, a compressor assembled from any one of the first, second, third, and fourth shells 305A-D can include four different standardized packing case configurations, which can be lubricated or non-lubricated packing cases. Any of the packing cases can be suitable for use with "sweet gas" or "sour gas." Sweet gas may include non-corrosive, non-toxic gas that does not require additional health and safety equipment to provide personal protection to compressor operators. Sweet gas may be assumed to be clean, natural gas. Sour gas may include corrosive and/or toxic gas requiring additional mandatory safety devices to be worn by compressor operators. Sour gas may include natural gas that has been contaminated with hydrogen sulfide. In some embodiments, any of the packing cases can be configured to include a purge line to vent the sour gas to a safe location.

In some embodiments, any of the packing cases can be configured to be cooled. For example, a packing case may include a plurality of coolant channels to distribute coolant throughout the packing case in order to maintain a desired operating temperature of the packing case. Additionally, any of the packing cases can be configured with resistance temperature detectors (RTD) or without RTDs. The RTD is a temperature measuring device that may be used to monitor the health of packing case 130 seals.

In some embodiments, the cylinder head used with an assembled shell/core can be a "standard"-type cylinder head 135, as shown in FIGS. 1 and 2, or it can be a "variable volume clearance pocket"-type cylinder head 335A, as shown and described in relation to FIG. 3A.

Figure 5A:
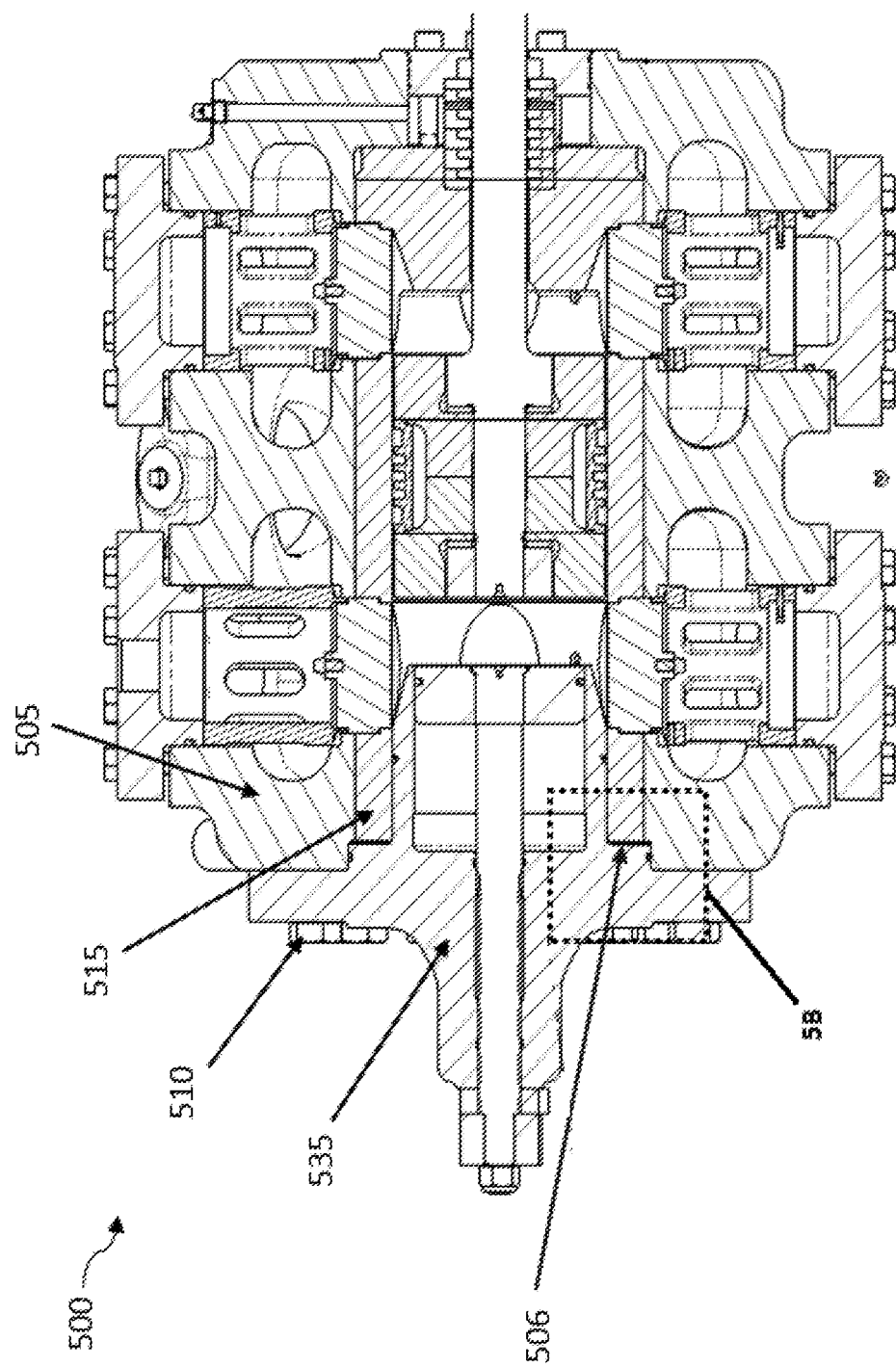
FIG. 5A is a cross-sectional view of an embodiment of a cylindrical compressor with a standardized shell and core configured with a cylinder head gasket.
Figure 5B:
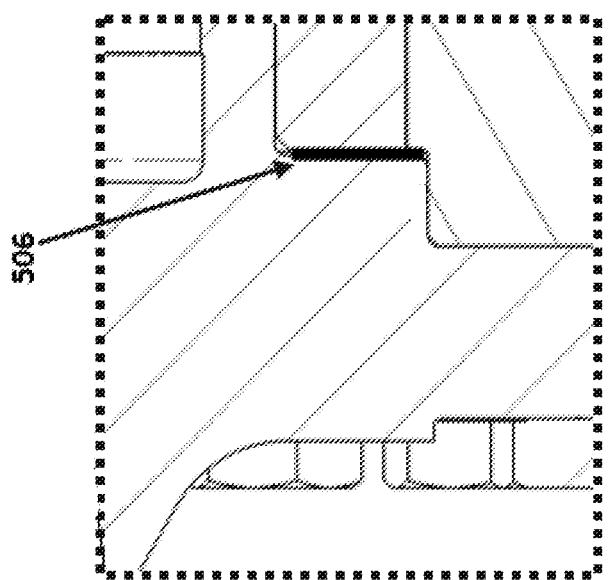
FIG. 5B is an enlarged cross-sectional view of the standardized shell and core of FIG. 5A with the cylinder head gasket.

The compressors discloses herein can also have a variety of other features to facilitate assembly and proper function. FIG. 5A shows an embodiment of a cylindrical compressor 500 with a standardized shell 505 and a core 515 configured with a cylinder head 535 and gasket 506. As shown in more detail in FIG. 5B, a gasket 506 is positioned at the head end (e.g., the cylinder head 135 end) of the compressor 100. The gasket 506 may be configured within a recession that may be machined into the assembled core 515 and shell 505. The gasket 506 may be in the form of a fiber gasket, a rubber gasket, a synthetic gasket, or the like. The gasket 506 may be secured between the assembled core 515 and shell 505 and the cylinder head 535 by the force of one or more cylinder head bolts 510 securing the cylinder head 535 to the shell 505. The gasket 506 can form a seal between the compressor volume, such as the compressor volume 315 shown in FIG. 3A, and the environment. The gasket 506 can be configured to prevent process gas from escaping the compressor. The gasket 506 can be positioned in the recession to prevent blow-outs due to pressure conditions outside of the normal operating range of the compressor 500. The gasket 506 may further seal the split line occurring between the shell 505 and the core 515.

Figure 6A:
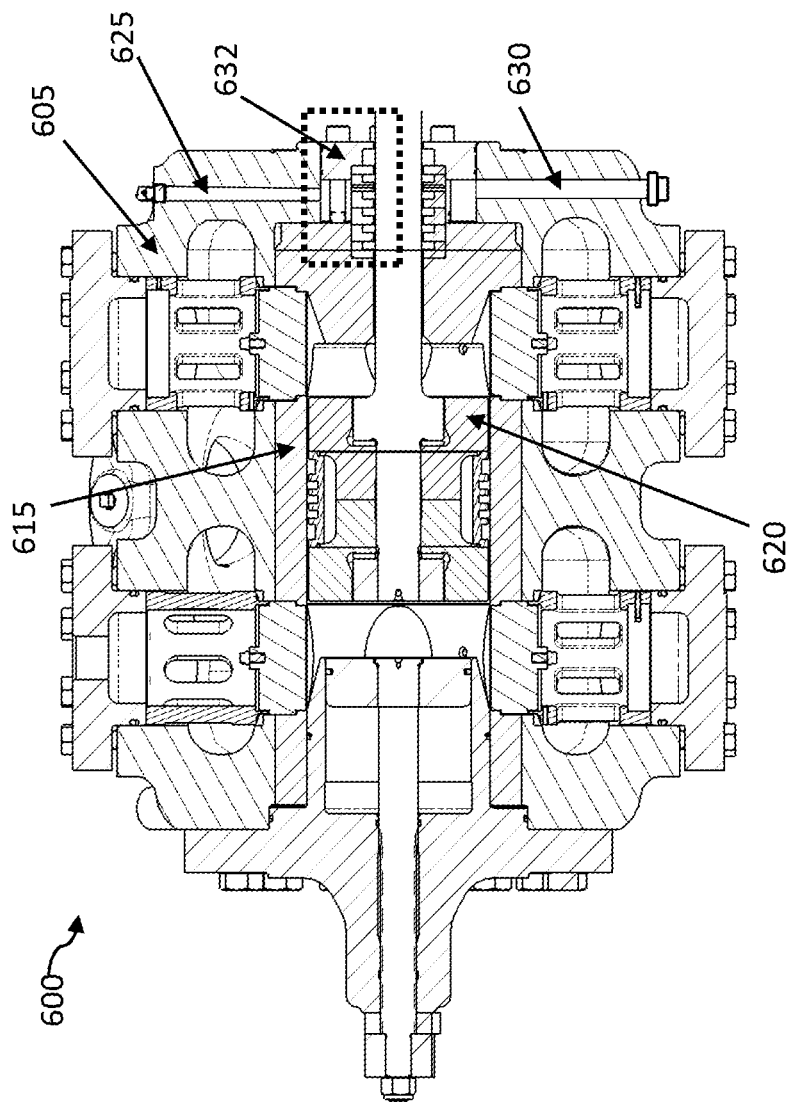
FIG. 6A is a cross-sectional view of an embodiment of a cylindrical compressor with a standardized shell and core configured with a packing case O-ring.
Figure 6B:
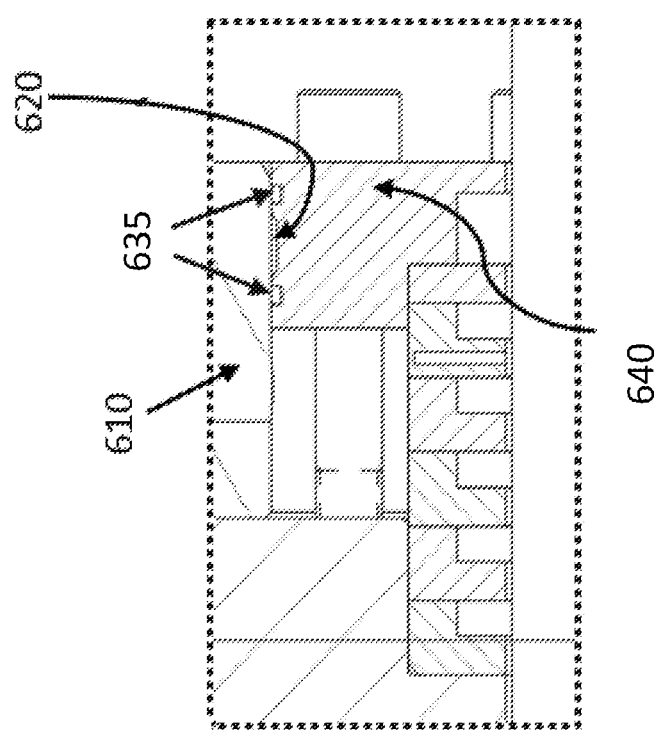
FIG. 6B is an enlarged cross-sectional view of the standardized shell and core of FIG. 6A with the packing case O-ring.

FIG. 6A shows another embodiment of a compressor 600 having a standardized shell 605 and core 615 configured with a packing case 632. The configuration of the packing case 632 shown in the dashed-line rectangle of FIG. 6A is shown in more detail in FIG. 6B. As shown in FIG. 6B, the O-rings 635 can be positioned at the crank end (e.g., the packing case 632 end) of the compressor 600. The O-rings 635 can seal the crank end of the compressor 600. The O-rings 635 can be positioned between the shell lip 610 and the packing case flange 640. The O-rings 635 can be positioned in grooves that are machined around the circumference of the packing case flange 640. The O-rings 635 can also provide a seal for lubricant within the lubrication channel 620 such that lubricant introduced into the packing case 632 remains within the lubrication channel 620. For example, referring back to FIG. 6A, the O-ring 635 located closer to the core 615 may prevent lubricant from entering the core bore 620, while the O-ring 635 located closer to the packing case 632 may prevent lubricant from escaping the packing case 632. The O-rings 635 can be in the form of rubber O-rings, synthetic O-rings, or the like.

As further shown in FIG. 6A, the compressor 600 includes a vent channel 625. The vent channel 625 can be coupled to the lubrication channel 620 shown in FIG. 6B and the drain channel 630 via passages inside the packing case 632. The vent channel 625 can vent or otherwise remove process gas fumes that may leak through the packing case 632 to mitigate safety or environmental issues during the operation of the compressor 600. The drain channel 630 can remove lubricant, such as a lubrication oil, that may be continuously leaking through the packing case 632 during operation of the compressor 600. If not removed, a surplus of oil can degrade the performance of the compressor 600 and can damage the compressor which may cause safety or environmental problems.

Figure 7A:
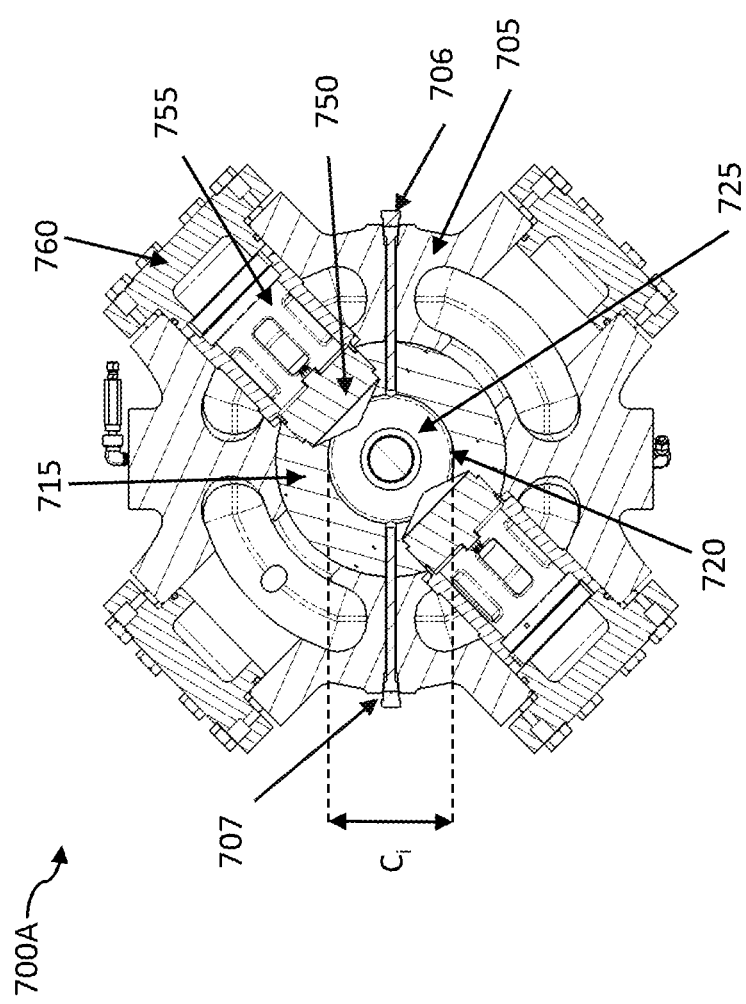
FIG. 7A is a cross-sectional view of another embodiment of a cylindrical compressor with a standardized shell and core configured with a set of indicator ports.

FIG. 7A is illustrates a head end (e.g., the cylinder head 135 end) of another embodiment of a compressor 700A, showing a set of indicator ports, including indicator ports 706 and 707. The illustrated indicator ports 706 and 707 are machined through the shell 705 and the core 715 after the core 715 has been inserted into the shell 705 and is held by interference fit. The indicator ports 706 and 707 allow measurement of pressure and temperature conditions as the compressor 700A operates during a compression cycle. Such measurements allow compressors operators to monitor the performance of the compressor 700A.

FIG. 7B illustrates a compressor 700B including a set of lubrication channels. As shown in FIG. 7B, the compressor 700B includes a first lubrication channel 708 and a second lubrication channel 709 that extend from outside the compressor 700B through the shell 705 and the core 715 and into the core bore 720. The lubrication channels 708 and 709 can be formed after the core 715 has been inserted into the shell 705. The lubrication channels 708 and 709 can be coupled to a lubrication reservoir and may direct lubricant from the lubrication reservoir into the core bore 720. The lubricant delivered via the lubrication channels 708 and 709 can increase the efficiency and life-time performance of the compressor 700B.

Figure 8:
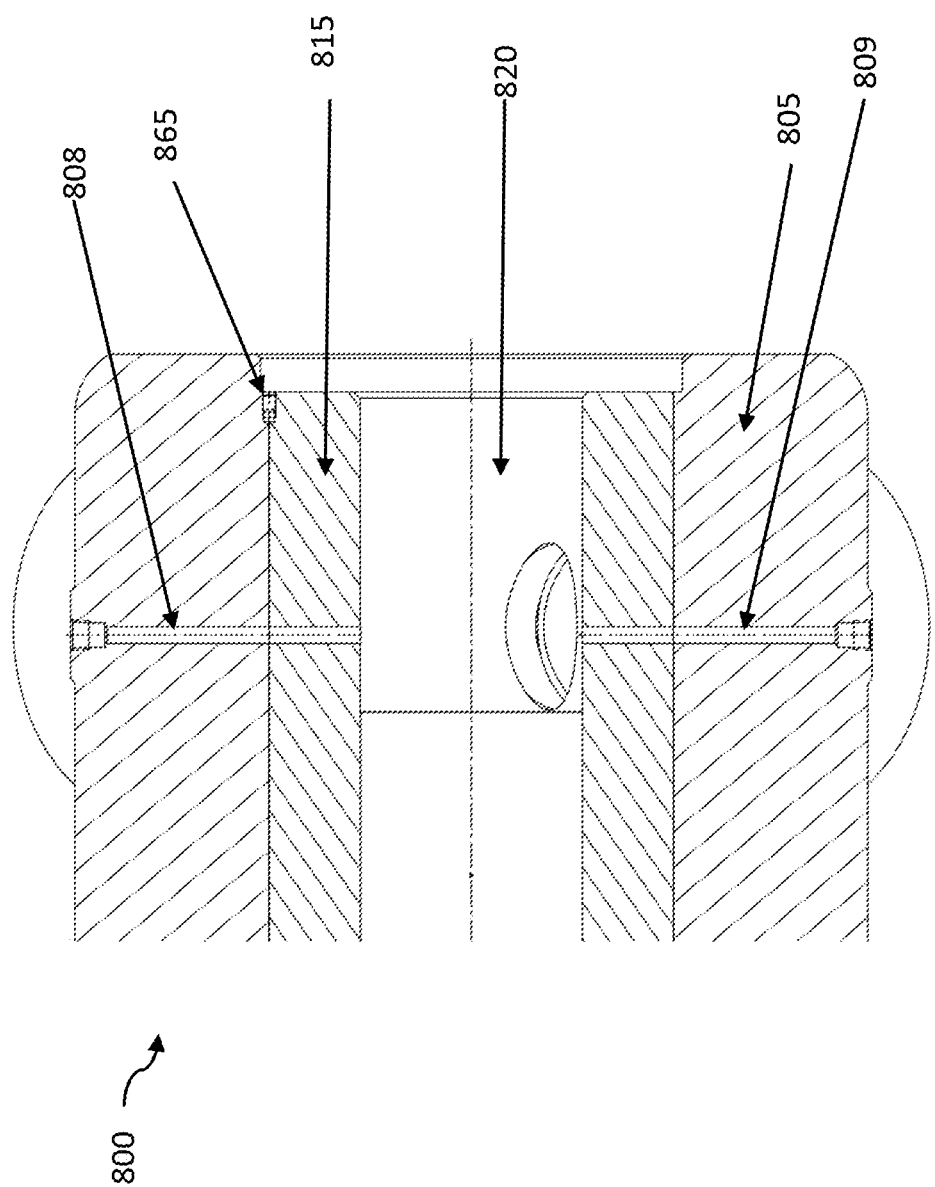
FIG. 8 is a cross-sectional view of another embodiment of a cylindrical compressor with a set screw securing the standardized core within the standardized shell.

FIG. 8 is a cross-sectional view of compressor 800 illustrating a set screw 865. The set screw 865 can be used to secure the core 815 within the shell 805. In this way, the set screw 865 provides an additional mechanism for securing the core 815 within the shell 805 during subsequent machining operations performed on the shell/core assembly. Additionally, the compressor 800 shown in FIG. 8 also includes a set of lubrication channels shown as lubrication channels 808 and 809. The lubrication channels 808 and 809 can be machined through the shell 805 and the core 815 to provide lubricant within the core bore 820.

The modular compressors disclosed herein can allow a manufacturer to stock a limited quantity of shells having predefined sizes, and to configure compressors having a broad range of size, with varying core bore diameters and valve sizes. In order to assemble a compressor from a standardized shell, one of several standardized shell sizes can selected. We refer to compressor 100 of FIG. 1 for reference purposes only in the following description.

Based on the predefined range of core bore diameters that are acceptable for use with the selected shell 105, a cast metal rod can be machined to form a core 115 having an outer diameter $C_o$ which provides an interference fit between the core 115 and the selected shell 105 when the core 115 is disposed within the shell bore 110 of the selected shell 105. In some embodiments, the rod is not machined and is selected from rod stock that is available in the manufacturer's inventory. The rod stock in inventory can include rods that have an outer diameter which are appropriately sized for insertion into one of the selected shells 105.

After selecting or machining the rod to form the core 115, the core can be inserted into the shell bore 110 of the selected shell 105 to form a shell/core assembly that provides a structurally enhanced component suitable for machining a bore 120 through the core 115 and valve bores 145 through the shell/core assembly so as to interface with the core bore 120. In some embodiments, the core 115 can be cooled prior to insertion to ease positioning the core 115 within the selected shell 105. After insertion, the shell/core assembly can be heated or can be allowed to return to ambient temperature without heating causing the core 115 to expand thereby securing the core 115 within the shell 105 via an interference fit. In some embodiments, the core 115 can be secured within the shell 105 via a set screw, such as the set screw 865 shown in FIG. 8.

With the shell and core assembly, the core 115 can be machined to form a core bore 120 extending longitudinally therethrough that defines a core bore diameter $C_i$. The core bore diameter can be within one of the predefined range of diameters corresponding to the selected shells 105. By machining the core bore 120 after the core 115 has been inserted into the shell 105, there is less chance for machining error when forming the core bore 120 because the core 115 is interference fit within the shell 115 forming a rigid body structure.

Once the core bore 120 has been machined into the core 115, at least one valve assembly bores 145 can be machined through the core 115 and the selected shell 105. The shell/core assembly provides a rigid structure allowing the valve assembly bores 145 to be machined so as to interface the valve assemblies 140 with the core bore 120. After machining the valve assembly bores 145, at least one valve assembly 140 having an acceptable size based on the selected shell size can be inserted into each of the valve assembly bores 145. The valve assembly 140 can include a valve holder 155 that can be inserted into the valve assembly bore 145. The valve assembly 140 can also include a spring-actuated valve positioned within the valve assembly bore 145 and interfaced with the core bore 120. In some embodiments, machining the valve assembly bores 145 includes machining screw threads capable of receiving a valve cap 160 which can be screwed onto the top of the valve assembly bore 145 to secure the valve assembly 140.

Following the machining of the valve assembly bores 145, a piston rod assembly 125 can be inserted into the core 115 such that the piston 215 and the piston rod 220 are positioned within the core bore 120.

After the piston rod assembly 125 has been inserted, the cylinder head 135 can be fastened to a first end of the selected shell 105 via a plurality of bolts. In some embodiments, a recession can be machined into the cylinder head 135 and into both the shell 105 and the core 115 before the cylinder head 135 is fastened to the first end of the shell 105. In some embodiments, the recession is machined into the shell 105 and the core 115 when formed as a shell/core assembly. Once the recession has been machined, a gasket can be positioned within the recession. Additionally, or alternatively, prior to fastening the cylinder head 135 to the selected shell 105, a variable volume clearance adjustment can be installed into the cylinder head 135. The variable volume clearance adjustment can include a variable volume clearance piston that can interface to the variable volume clearance adjustment head 312 when the cylinder head 135 is fastened to the selected shell 105.

In addition, a packing case 130 can be fastened to the core 115 at second end of the selected shell 105. The packing case 130 can include a flange and can allow the piston rod 220 to travel longitudinally through the core bore 120. In some embodiments, prior to fastening the packing case 130 to the core 115, a plurality of grooves can be machined into the circumference of the packing case flange and an O-ring can be positioned with each groove. In other embodiments, prior to fastening the packing case 130 to the core 115, a lubrication channel can be machined into the circumference of the packing case flange.

Figure 9:
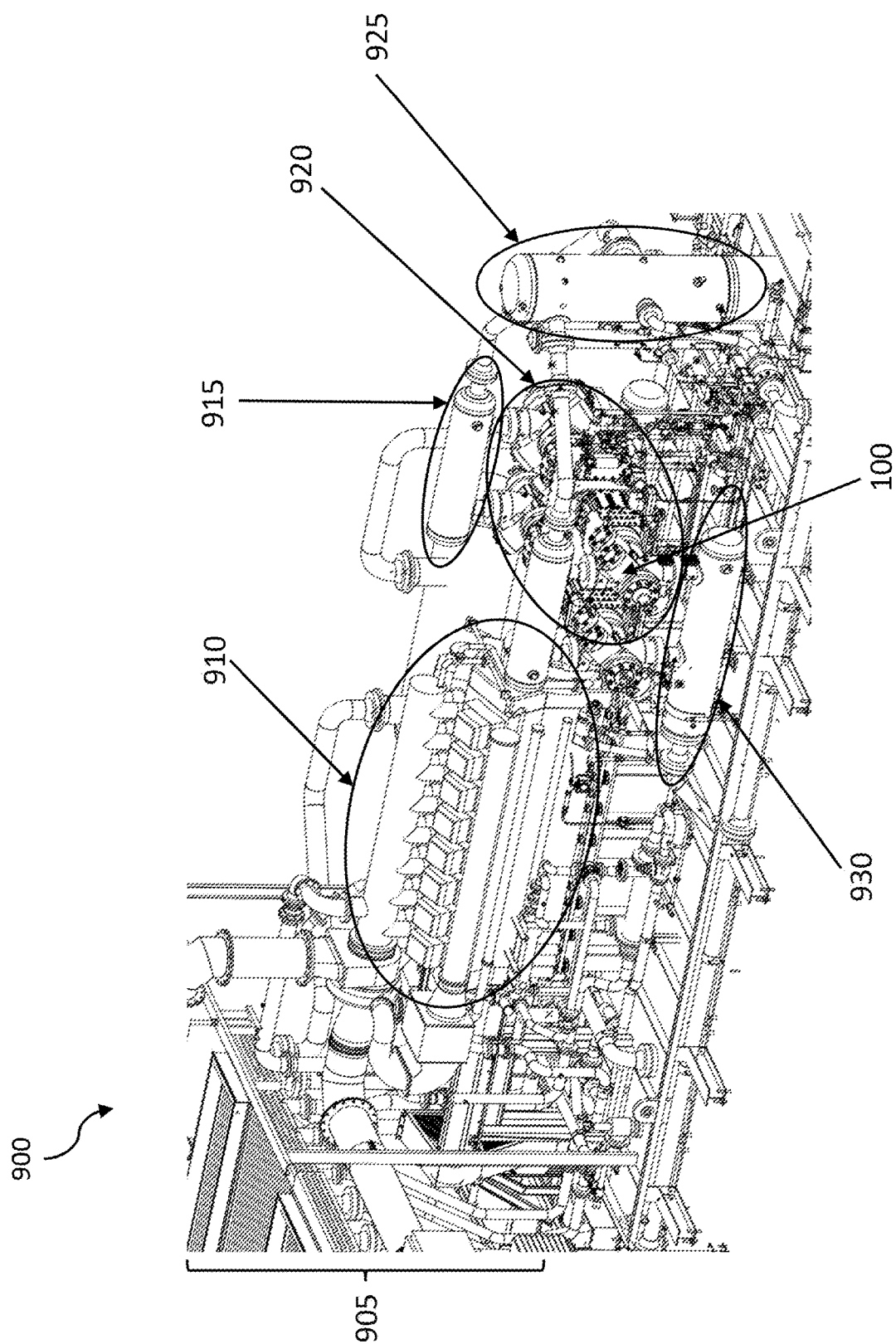
FIG. 9 is a diagram illustrating a system for compressing and distributing natural gas within an oil and gas production environment using the compressor of FIG. 1.

Once a compressor is assembled, it can be used in a system for compressing and distributing natural gas within an oil and gas production environment, as shown in FIG. 9. The illustrated system 900 includes a cooler 905, an engine 910, a suction pulsation device 915, a compressor frame 920 that is configured with multiple compressors 100, a scrubber 925, and a discharge pulsation device 930. The engine 910 can be an internal combustion engine configured to combust fuel, such as gasoline, or the engine 910 may be configured to combust gas, such as natural gas. In some embodiments, the engine 910 can receive natural gas that is being processed by the system 900 as its fuel source. The engine 910 can include an electric motor or electric drive. The engine 910 may include a crank case and running gear that is operable to rotate a crank shaft coupling the engine to the one or more compressors 100. The crank shaft rotation produced during operation of the engine 910 may cause a piston and piston rod assembly positioned within each compressor 100 to travel within the compressor bore. As a result, uncompressed natural gas is received by the compressors 100 via an input valve assembly. The natural gas is compressed by the action of the piston and piston rod assembly within the compressor bore and distributed from the compressors 100 via output valve assemblies that are interfaced with the bore. The cooler 905 can be configured to provide cooling for the engine 910 as well as other components of the system 900. In some embodiments, the cooler 905 can provide cooling to the uncompressed natural gas that is input to the compressors 100 and/or the compressed natural gas that is output from the compressors 100. The suction pulsation device 915 can be coupled to the input valve assemblies of the compressors 100 and can be configured to equalize the volume of uncompressed natural gas that is provided to the compressor 100. The suction pulsation device 915 can be coupled to the natural gas source and can act as a collecting device to accumulate uncompressed natural gas before being compressed and distributed further by the system 900. The system 900 may be configured with one or more suction pulsation devices 915 depending on the number of unique pressures that the system 900 is configured to generate. The illustrated system 900 also includes a scrubber 925 that is coupled to the suction pulsation device 915 and is operable to clean or otherwise improve the quality of the natural gas that is provided to the compressor 100 via the suction pulsation devices 915. The system 900 can also include a discharge pulsation device 930 that is coupled to the output valve assemblies of each compressor 100 and that can be configured to receive the compressed natural gas prior to further distribution in the production environment. The discharge pulsation device 930 can be configured to equalize the volume of compressed natural gas that is output by the compressor 100. The discharge pulsation device 930 may act as a collecting device to accumulate compressed natural gas before being distributed further by the system 900. The system 900 may be configured with one or more discharge pulsation devices 930 depending on the number of unique pressures that the system 900 is configured to generate. The compressor frame 920 can provide a structural support mechanism for the compressors 100 and one or more compressors 100 may be affixed on the compressor frame 920.

The system 900 may be deployed at one or more locations in an oil and gas production environment. The system 900 may be constructed in advance and deployed as needed at multiple sites where compression of natural gas is required. In some embodiments, the system 900 may also include heat exchangers, sensor systems, control systems, safety devices, batteries, as well as fuel and lubrication reservoirs. In some embodiments, the system 900 may be configured on a frame or skid that includes mechanisms for transporting the system 100 from one location to another. Once located at the desired operating location, the system 900 can be connected to a low pressure side natural gas input where uncompressed natural gas is received by the system 900. The system 900 can be further connected to a high pressure side gas output where compressed natural gas is distributed from the system 900.

Exemplary technical effects of the apparatuses, systems, and methods of manufacture described herein include, by way of non-limiting example, improved performance by a cylindrical natural gas compressor with a separable shell in an oil and gas production environment. By forming the compressor with an inner core inserted to provide structural support to the compressor shell and the coupled shell and core assembly itself, compressor operating performance may be increased as a result of machining valve openings closer to the compressor bore. As a result, the compressor may input of uncompressed natural gas more efficiently and discharge of compressed natural gas more efficiently by way of valves that are directly interfaced to the compressor bore volume.

A further exemplary technical effect of the apparatuses, systems, and methods of manufacture described herein also includes, by way of non-limiting example, reduced compressor design maintenance. By standardizing the compressor component dimensions and components inter-operability across ranges of shells, fewer compressor designs may be required compared to compressor designs that are specifically customized and cast from scratch based on a customer order. The standardized compressor design described herein provides for a limited, defined set of compressor design combinations can be learned and documented and thus require reduced training documentation as well as fewer resources to maintain the design sets as compared to non-standardized compressor designs.

Another exemplary technical effect of the apparatuses, systems, and methods of manufacture described herein also includes, by way of non-limiting example, standardized inventory and supply chain management. The standardized compressor design described herein affords manufacturers with reduced complexity for inventory management. For example, the standardization of the compressor components and dimensionality allow manufacturers to plan and acquire inventory farther in advance, reduce change and variation on product sales documentation and internal accounting system ledgers, as well as the computing systems which may be used to manage inventory. Additionally, supply chain management can be simplified by the standardization of the compressor components such that the manufacture knows the exact specification for all components and can source the components more efficiently at higher quality as a result. Non-standardized compressor manufacturers may not be able to achieve such benefits because each compressor is built to order and customized based on the specifications identified in the customer order.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

What is claimed is:

1. A kit of parts for assembling a compressor for compressing and distributing natural gas, the kit of parts comprising:

first and second cylindrical cast metal shells, the first cylindrical cast metal shell having a shell bore extending longitudinally therethrough and defining a first shell bore diameter that is configured to receive a cylindrical metal core having a core bore diameter within a first predefined range of diameters, and the second cylindrical cast metal shell having a shell bore extending longitudinally therethrough and defining a second shell bore diameter that differs from the first shell bore diameter and that is configured to receive a cylindrical metal core having a core bore diameter within a second predefined range of diameters, the first predefined range of diameters differing from the second predefined range of diameters;

a cylindrical metal core having an outer diameter that provides an interference fit between the cylindrical metal core and one of the first and second cylindrical cast metal shells when the cylindrical metal core is disposed within the shell bore of the one of the first and second cylindrical cast metal shells, and the cylindrical metal core having a core bore extending longitudinally therethrough that defines a core bore diameter within one of the first and second predefined range of diameters;
a cylinder head configured to removably couple to a first end of the cylindrical cast metal shell;
a piston assembly configured to be positioned within the core bore and including a piston coupled to a piston rod; and
a packing case configured to couple to the cylindrical metal core at a second end of the cylindrical cast metal shell, the packing case being configured to allow a piston rod to travel longitudinally through the core bore.

2. The kit of claim 1, further comprising:
a third cylindrical cast metal shell having a shell bore extending longitudinally therethrough and defining a third shell bore diameter that differs from the second shell bore diameter, the third shell bore diameter being configured to receive a cylindrical metal core having a core bore diameter within a third predefined range of diameters that differs from the second predefined range of diameter; and
a fourth cylindrical cast metal shell having a shell bore extending longitudinally therethrough and defining a fourth shell bore diameter that differs from the third shell bore diameter, the fourth shell bore diameter being configured to receive a cylindrical metal core having a core bore diameter within a fourth predefined range of diameters that differs from the third predefined range of diameter.

3. The kit of claim 2, wherein the first predefined range of diameters comprises 4.5 inches to 9.0 inches, the second predefined range of diameters comprises 9.25 inches to 14.0 inches, the third predefined range of diameters comprises 14.25 inches to 20.0 inches, and the fourth predefined range of diameters comprises 20.0 inches to 26.5 inches.

4. The kit of claim 1, wherein the piston assembly comprises a plurality of piston assemblies, each piston assembly having a piston diameter and a piston rod size that differs from one another.

5. The kit of claim 2, wherein the piston assembly comprises a plurality of piston assemblies, each piston assembly having a piston diameter and a piston rod size, and wherein the plurality of piston assemblies comprises a first piston having a piston diameter in a range of 4.5 inches to 6.5 inches, a second piston having a piston diameter in a range of 6.75 inches to 14.0 inches, and a third piston having a piston diameter in a range of 14.25 inches to 26.5 inches.

6. The kit of claim 5, wherein the first piston rod has a piston rod size of 2.0 inches, the second piston rod has a piston rod size of 2.25 inches, the third piston rod has a piston rod size of 2.5 inches, and a fourth piston rod has a piston rod size of 2.75 inches.

7. The kit of claim 1, wherein a thickness of a sidewall of the first and second cylindrical cast metal shells is less than a thickness of a sidewall of the cylindrical metal core.

8. The kit of claim 1, further comprising at least one O-ring configured to be positioned in one or more grooves formed along a circumference of a flange of the packing case, each of the at least one O-rings being configured to seal the packing case to a lip of one of the first and second cylindrical cast metal shells.

9. The kit of claim 1, further comprising a gasket configured to be seated within a recession of the cylinder head such that the gasket overlaps portions of the cylindrical metal core and the cylindrical cast metal shells when the cylindrical metal core is disposed within the shell bore of the one of the first and second cylindrical cast metal shells.

10. The kit of claim 1, further comprising a set screw configured maintain a position of the cylindrical metal core relative to one of the first and second cylindrical cast metal shells when the cylindrical metal core is disposed within the shell bore thereof.

11. A method for manufacturing a compressor for compressing and distributing natural gas, the method comprising:
selecting one of first and second cylindrical cast metal shells, the first cylindrical cast metal shell having a shell bore extending longitudinally therethrough and defining a first shell bore diameter that is configured to receive a cylindrical metal core having a core bore diameter within a first predefined range of diameters, and the second cylindrical cast metal shell having a shell bore extending longitudinally therethrough and defining a second shell bore diameter that differs from the first shell bore diameter and that is configured to receive a cylindrical metal core having a core bore diameter within a second predefined range of diameters, the first predefined range of diameters differing from the second predefined range of diameters;
machining a cast metal rod to form a cylindrical metal core having an outer diameter that provides an interference fit between the cylindrical metal core and the selected one of the first and second cylindrical cast metal shells when the cylindrical metal core is disposed within the shell bore of the selected one of the first and second cylindrical cast metal shells; and
inserting the cylindrical metal core into the shell bore of the selected one of the first and second cylindrical cast metal shells;
machining the cylindrical metal core to have a core bore extending longitudinally therethrough that defines a core bore diameter that is within one of the first and second predefined range of diameters that corresponds to the selected one of the first and second cylindrical cast metal shells;
inserting a piston assembly within the core bore of the cylindrical metal core;
fastening a cylinder head to a first end of the selected one of the first and second cylindrical cast metal shells; and
fastening a packing case to the cylindrical metal core at a second end of the selected one of the first and second cylindrical cast metal shells, the packing case including a packing case flange and allowing a piston rod of the piston assembly to travel longitudinally through the core bore.

12. The method of claim 11, further comprising machining a recession into the cylinder head and into the cylindrical cast metal shell and the cylindrical metal core before the cylinder head is fastened to the first end of the selected one of the first and second cylindrical cast metal shells.

13. The method of claim 11, further comprising, prior to fastening the cylinder head to the first end of the selected one of the first and second cast metal shells, installing a variable volume clearance adjustment into the cylinder head, the variable volume clearance adjustment including a variable volume clearance adjustment piston interfaced to a variable volume clearance adjustment head configured within the cylinder head when the cylinder head is fastened to the first end of the selected one of the first and second cylindrical cast metal shells.

14. The method of claim 11, further comprising, prior to fastening the packing case to the cylindrical metal core, machining a plurality of grooves into a circumference of the packing case flange and an O-ring is positioned within each groove.

15. The method of claim 11, further comprising, prior to fastening the packing case to the cylindrical metal core, machining a lubrication channel into a circumference of the packing case flange.

16. The method of claim 11, further comprising machining at least one valve assembly bore after inserting the cylindrical metal core into the shell bore of the selected one of the first and second cylindrical cast metal shells, the at least one valve assembly bore being configured to receive a valve assembly.

17. The method of claim 16, further comprising installing at least one valve assembly into at least one of the valve assembly bores, the at least one valve assembly including a spring-actuated valve positioned within the valve assembly bore so as to interface the valve with the core bore, a valve holder inserted into the valve assembly bore, and a valve cap attached to the valve assembly bore.

18. The method of claim 16, further comprising securing the cylindrical cast metal core inserted into the shell bore of the selected one of the first and second cylindrical cast metal shells using a set screw.

* * * * *